Figure 1:
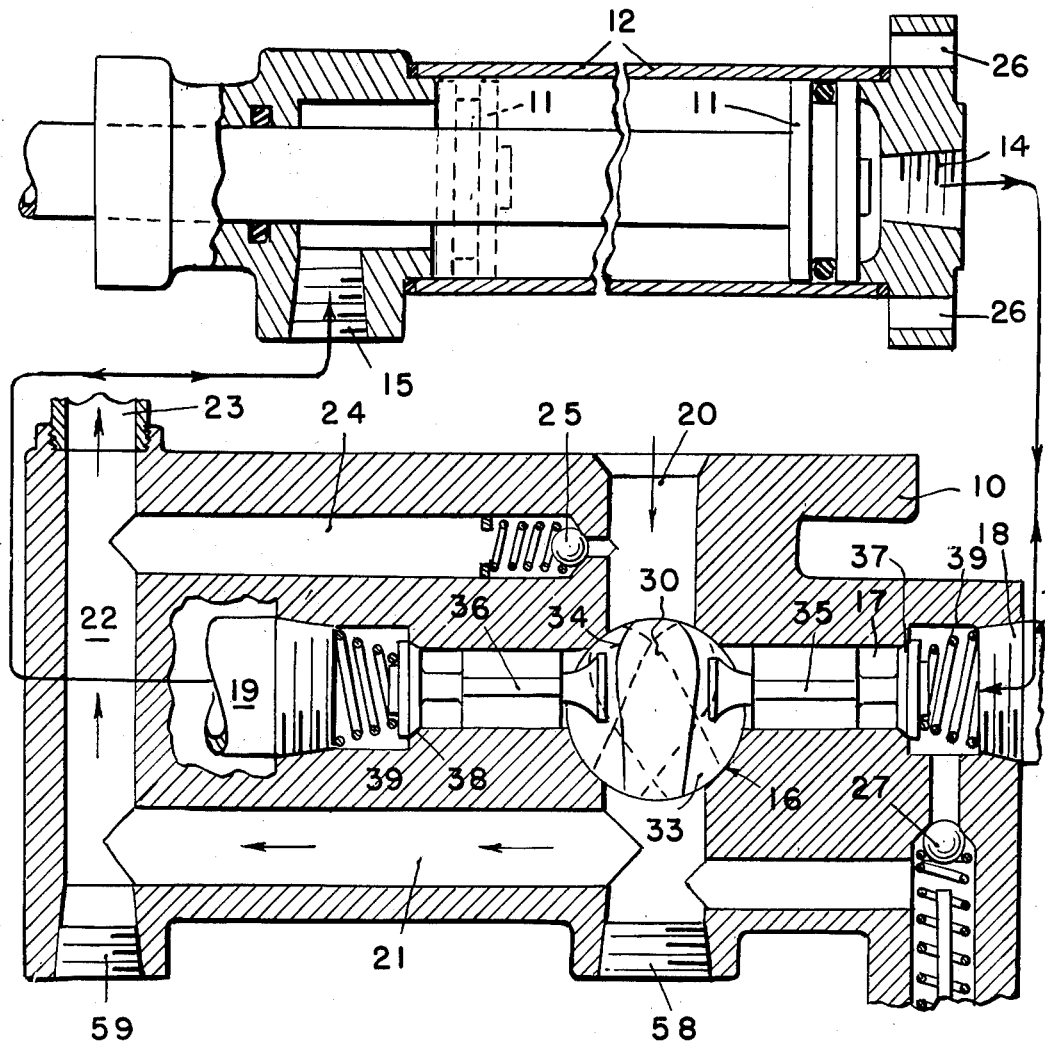

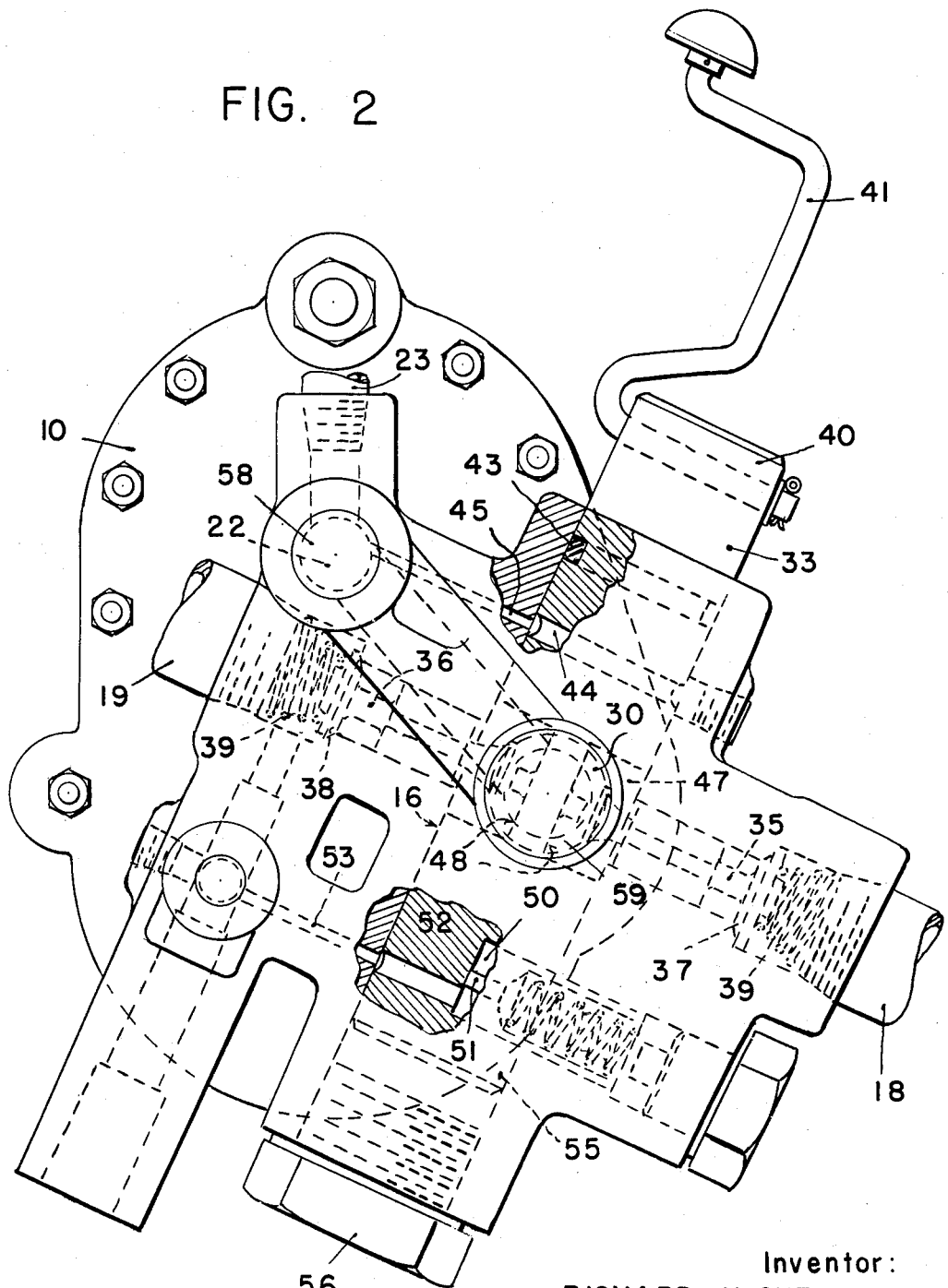

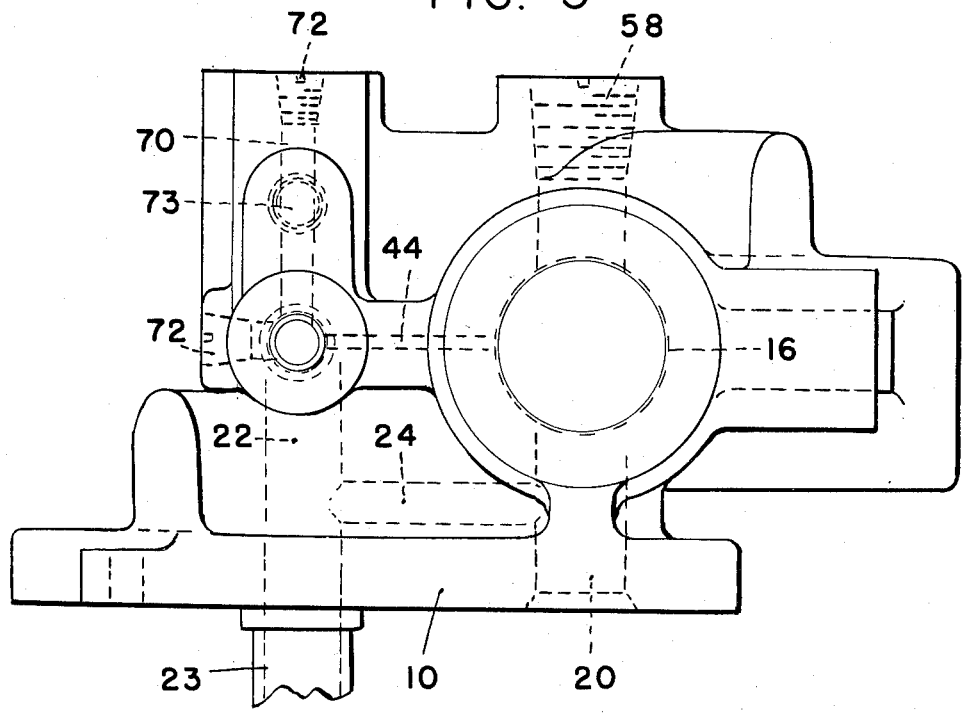
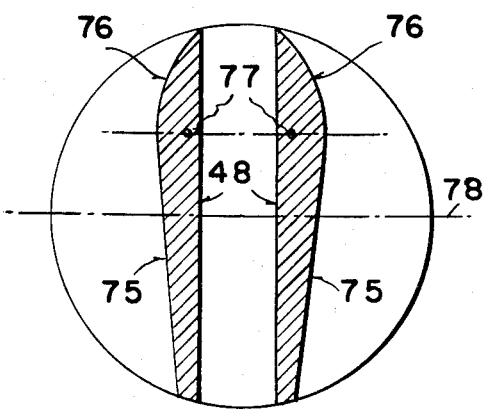

Jan. 3, 1956  R. H. SHEPPARD  2,729,240
PLURAL-WAY DISTRIBUTING VALVE
Filed June 12, 1950  4 Sheets-Sheet 4
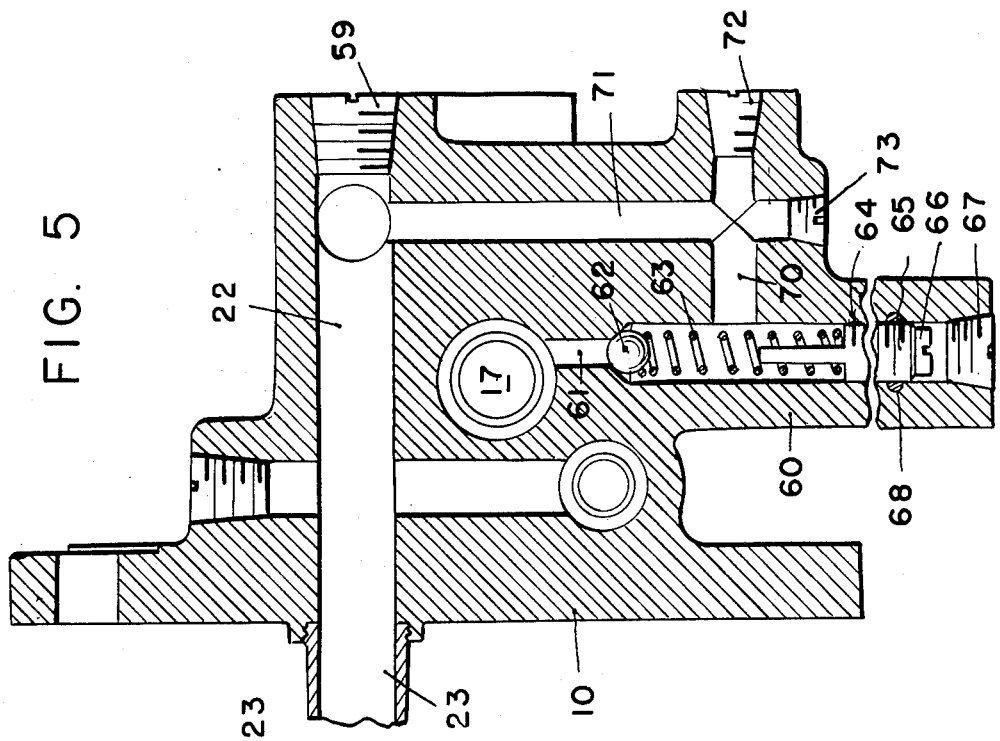
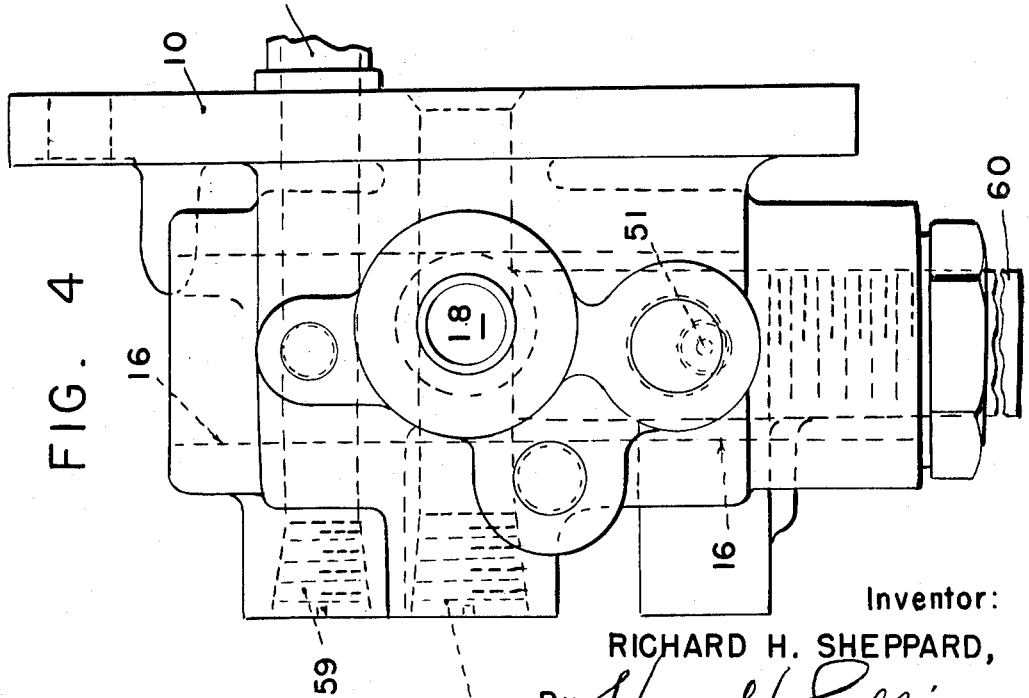
Inventor:
RICHARD H. SHEPPARD,
By Henry H. Snelling
Attorney

United States Patent Office 2,729,240
Patented Jan. 3, 1956

2,729,240

PLURAL-WAY DISTRIBUTING VALVE

Richard H. Sheppard, Hanover, Pa.

Application June 12, 1950, Serial No. 167,622

10 Claims. (Cl. 137—621)

This invention relates to valves and more particularly those of a hydraulic nature employed for the control of moderate fluid flows and having a plural-way structure.

In valves used in a hydraulic system for the operation of cylinders and pistons employed in lifting or otherwise moving certain sections or parts of equipment such as agricultural implements on field machines such as tractors, difficulty is experienced in preventing leakage, and in taking up unusual hydraulic stresses incurred in the application of the pressure transmitted by the hydraulic medium and by the implements used therewith so they will not injure the structure or mechanism of the valve or the various implements moved by the tractor.

In this invention the valve control is thru the use of an oscillating cam member or element pressing selectively against the valve stems to open the valve seals at appropriate periods of operation and is actuated exteriorly by a suitable handle. The valve body is also arranged for intimate attachment to a pressure pump for the operation of the medium, in a manner that will combine it in an effective and compact assembly. Provision is also made thru the use of a mechanism such as a ball valve, spring and chamber for the relief of excessive pressures that may arise during the use of the medium in the device, or in the system to which it is connected.

It is therefore an object of this invention to provide a new and improved plural-way valve that will avoid the disadvantages and limitations of the previous art.

Another object of this invention is to provide a new and improved plural-way valve employing an oscillating element for the control of the flow in such a manner that leakage on the return flow is entirely avoided as the control element only unseats the valves and the return pressure holds the valves to their seats.

In the drawings:

Figure 1 is a schematic view.
Figure 2 is a front elevation, partly in section.
Figure 3 is a bottom view.
Figure 4 is a side elevation.
Figure 5 is a section of Figure 2.
Figure 6 is a section thru the rotor shaft showing the cam.

In the diagrammatic view, Figure 1, the valve body has a flat plate or base 10 which forms a cover for the pump which supplies oil under pressure to the valve body for selective discharge to one end or the other of a piston 11 moving in cylinder 12 as the pressure is exerted against the high pressure end thru port 14 or against the rod end thru port 15. The valve body has two major bores at right angles to each other, the control rod bore 16 appearing a circle in the figure while the main valve chamber is the bore 17 having at one end a pipe 18 leading to port 14 and at the other end a pipe 19 leading to the rod end port 15 of cylinder 12. An entry bore 20 normal to bore 17 admits oil under pressure from the pump, and when the parts are in neutral position directs the oil past a cam 30 to cross passage 21 to discharge passage 22 leading to the reservoir thru hollow shaft 23 of the pump. The base 10 where it is in contact with the integral body is solid except for the two holes forming parts of passageways 20 and 22, but has other holes as 26 for receiving bolts to secure it to the pump. A passage 24 controlled by a ball 25 is a mere permanent by-pass to return oil direct to the reservoir in case of difficulty. The spring-pressed ball 27 is part of an adjustable by-pass to protect the parts in case of a shock load, for example when a cultivator shovel strikes an obstruction such as a rock.

In the bore 16 is a rotor shaft 33 snugly fitting the bore in a number of locations and having about centrally a valve engaging cam 34 adapted to be oscillated about 30° to either side to slide either valve 35 or 36 off its seat 37 or 38 so as to direct oil from passage 20 to pipe 18 for example by moving the control shaft to the left, whereupon piston 11 will move to the left and the displaced oil on the rod side will flow thru port 15, pipe 19, and thru seat 38 because at this time valve 36 is cammed open against the urge of its spring 39 so the returning oil passes to the reservoir thru passageways 21 and 22, the cam blade closing communication between the bore 20 and passageway 21. The oil pressure readily opens valve 35 against its spring so there is no occasion for the cam to touch this valve when supplying oil to the high pressure side of the cylinder 12, as by moving the top of the cam 30 to the left in Figure 1. Moving the cam of the control shaft to the right moves the piston 11 to the right and the return oil flow is thru port 14, pipe 18, past valve 35 cammed off its seat 37 and down thru passageway 21 to the reservoir.

Referring now to Figure 2, the view is looking toward the tractor (not shown) which carries the pump, the cover of which is the valve body base 10. The control shaft 33 extends at an angle having a portion 40 extending beyond the body and receiving a handle 41 for manual operation. The shaft 33 has a groove for an oil ring 43, a second groove 44 to lead pressure from the oil ring and discharging thru small hole 45 to return passage 22 leading directly away from the observer thru base 10 to the hollow shaft 23 and the reservoir. Below groove 44 the control shaft is cut away as at 47 to provide a pair of flat surfaces 48 in the center of which is the cam 30 for unseating one or the other of the valves 35 and 36 when the control shaft is moved from the neutral position illustrated. Further down the rotor shaft or control rod 33 is a deep half diameter cut 50 engaged by a centralizer 51 spring-pressed to hold the shaft 33 in neutral and also to act as a stop to limit movement of the shaft at either side. The half side of the shaft has a groove 52 discharging thru small hole 53 to the adjustable by-pass to protect the centralizer. The bottom end 55 of shaft 33 is short of the lower end of the bore 16 which is here closed by a plug 56. Plugs 58 and 59, respectively, close bores 20 and 22.

In Figure 5 the main valve chamber bore 17 is about in the center of the figure. A short passage 61 leads to the ball 62 of the adjustable by-pass housed in the elongated cylinder 60 near the bottom of the valve body. A spring 63 holds the ball to its seat and is tensioned by a threaded portion 64 which has considerable axial movement in the threads 65 as governed by rotation of the head 66. The bore of the by-pass is closed by a plug 67 protected by an oil-ring 68. Upon excess pressure the oil unseats the ball 62 and passes thru passageways 70 and 71 to the return passageway 22. Plugs 72 and 73 close these bores.

The cam is shown best in Figure 6 which is twice the usual scale. The portion with the two flat sides 48 is in section and beyond this in elevation toward the end 55 are the two curved sides of the cam 30. The flat sides 75 slope at an angle of 6° and are tangent to the arcs 76, struck from centers 77 outside the plane surfaces 43, at the widest part of the cam. A plane parallel to the axis contains the two centers 77 and the two tangent points and is well spaced from centerline plane 78, being .294" above this plane in Fig. 6, the diameter of control shaft 33 being 1⅜" as illustrated, the distance apart of the flats 48 is 5/16", and the length of the radius of arc 76 is a half inch. The arcuate camming surfaces 76 completely unseat the valves and the slight 6° taper clears the other valve. By having the widest portion above the centerline it is possible to avoid contact with both valves as in previous structures.

The operation of the device is as follows: The flow of hydraulic fluid thru the valve assembly is controlled by a movement from neutral position to 30° to the right or 30° to the left of neutral position of the rotor shaft 33 which includes as an integral portion the narrow slab between the faces 48 and having centrally the cam 30. When the control handle is in a vertical or neutral position the hydraulic fluid discharged by the hydraulic pump attached to the base 10 is conveyed thru drilled passage 20 past the flats 48 and passes out thru passageways 21 and 22 the latter leading directly thru a hollow shaft 23 of the pump, not illustrated in this application but shown in my Patent No. 2,589,880 granted March 18, 1952. The hollow shaft 23 leads to the pump reservoir. Should the oil pressure rise above the normal operating range as caused, for example, by extremely cold weather or some abnormal restriction, the valve 25 will open by-passing the oil from the pressure side of the valve assembly to the drain side of the assembly thru passage 24 and 22. This ball 25 is of well known construction and only functions when one or the other of the two distributing valves are cammed open. In neutral position there would be no occasion for the valve 25 to open as the high pressure oil from the pump would pass directly to the revervoir through passage 21.

To operate the assembly that is to direct the flow to the port 14 or the port 15 of the cylinder, it is merely necessary to rotate the shaft 33 to the right or to the left depending, of course, on which side of the piston in the cylinder it is desirable to exert pressure. When the control shaft is rotated in either direction, the flats 48 close the flow of liquid to the passage 21 and by the cam action one or the other of the valves is forced open. The fluid is directed toward the valve which is not cammed open and since the passage 21 is now closed the uncammed valve will promptly open against the pressure of its spring and at the same time the valve which has been cammed open will permit free passage of the oil from the cylinder 12 thru the chamber formed by the three intersecting bores and will discharge thru passageways 20 and 22. The centralizer 51 not only forms a stop to limit the oscillation of the shaft 33 but also serves to hold the control rod in neutral position whenever the operator releases the handle 41.

In the particular illustration there will be a sudden shock load in one direction only and the adjustable by-pass in the barrel 60 is merely a safety valve for overload protection. Its use, however, allows the piston to retract under these sudden impacts and thus eliminates any excess stress in the mechanical parts. Under excessive pressure on the end of the cylinder piston rod, the pressure in the cylinder in front of the piston is built up and is applied to the upper side of the spring load ball valve 62. When the pressure exceeds that for which by the by-pass has been set by means of a screwdriver applied to the kerf in the bottom of the member 64, the ball will drop from its seat allowing the fluid from in front of the piston to flow past the ball valve 62 and return to the reservoir thru passages 70 and 71. As the piston 11 moves in its cylinder 12, a slight vacuum is created in back of the piston as the shut-off valve controlling the flow of fluid is in the neutral or closed position. When this vacuum reaches a slight amount, just a few pounds, the shut-off valve to that side of the cylinder will open against its spring allowing the fluid to flow into the cylinder in back of the piston to whatever amount the piston was displaced because when the control valve is in neutral the full pressure passes between the two valves. The size of the passages is such that the pressure of the full flow output of the pump into the drain passage back to the reservoir is insufficient to lift either of the shut-off valves from their seats unless a vacuum is exerted above the valve. Once the shut-off valve has been lifted from its seat because of the vacuum above it, the total area of the face of the valve increases sufficiently to prevent the valve from closing against the flow of the fluid until the vacuum in the cylinder has dropped to zero or approximating it. After the excess load is removed from the cylinder, the piston can be reset to its original position by turning the control handle 41 to proper position until the piston assumes initial position after which naturally the control handle is moved again to neutral position. While generally there would be a sudden shock load on one side only, the adjustable by-pass could readily be duplicated should a condition arise where the shock could occur from pressure at either end of the cylinder.

What I claim is:

1. In a distributing valve, a body having therein a main valve chamber and a bore intersecting the chamber to form two branches of the chamber, a pair of opposed valves in the chamber on opposite sides of said bore and spring pressed to their seats and toward the bore, a third bore passing thru the intersection, a cylindrical shaft in said third bore having a reduced portion forming a central blade with flat sides each facing a branch of the chamber, said shaft being oscillatable in its third bore to close communication between the bore and either branch at will, a cam projection on each side of said member, and a head on each of the opposed valves extending into the path of the proximate projection to be engaged thereby to unseat its valve as the member is rocked about its axis to direct flow through the opposite branch.

2. The valve of claim 1 in which the cam projections are widest to one side of a plane thru the axes of the shaft and of the bore.

3. The valve of claim 2 in which the sides of the two cam projections slope from said widest points to the far end of the shaft.

4. A control member for a distributing valve comprising a cylindrical shaft cut away equally on two sides to leave a central blade having parallel sides spaced apart a distance less than the cut on either side and a cam extending transversely from each flat side.

5. The member of claim 4 in which each cam consists of an arcuate portion and a plane side sloping with respect to the proximate side of the central blade.

6. The member of claim 5 in which the junction of the plane side and the arcuate portion is roughly halfway between the axis of the shaft and one end of the central blade.

7. In a distributing valve, a body having three intersecting bores therein each having an axis at right angles to the axes of the other two, being respectively a distributing bore having a passage extending from the point of intersection thru body on opposite sides, an entry bore, and a control shaft bore, a spring pressed check valve in each of the two passages having a head projecting into the control shaft bore, a control shaft oscillatable in the control shaft bore and having a centrally positioned diametrical blade in the intersection thinner than the diameter of the entry bore so that fluid may pass on both sides of the blade when in neutral position and at either end of its travel the fluid is deflected into a chosen passage at will while closing the entry bore beyond the intersection, and cam portions extending laterally from opposite sides of the blade into the path of movement of said heads to open one or the other of the valves when the control shaft is moved from neutral position to a distributing position.

8. The device of claim 7 in which said cam portions each consist of a curved surface entirely to one side of a diameter lying in a plane containing the axis of the distributing bore and a plane cam surface sloping from one end of the blade to a point of tangency with the curved surface.

9. In a distributing valve, a control shaft, a body having three bores each intersecting the other two at right angles, said bores being an entry bore, a distributing bore, and a third bore housing the control shaft, a control shaft in the third bore, a spring-pressed valve at either side of the control shaft in the distributing bore, said shaft including a central cam portion adapted to unseat selectively the valves, extending diametrically from side to side of the third bore and of less thickness than the entry bore so that fluid may pass through the entry bore on both sides of the cam portion when the latter is in neutral position, said body also including a return bore parallel to the entry bore and in communication with the entry bore when the cam is in neutral position, said portion serving to close selectively the flow of liquid from the entry bore to one side or the other of the distributing bore.

10. A distributing valve structure for discharging liquid under pressure at spaced points, said valve structure including a bore having two spaced seats, a valve engaging each seat, springs urging the valves toward each other and against their seats, and means for selectively unseating the valves to permit return through the unseated valve, the pressure on each seated valve being in the direction of its spring urge, said means including an oscillating shaft having a centrally positioned blade with parallel flat sides and opposed cam surfaces extending laterally from the flat sides and each including an arc surface and a plane surface tangent to the arc surface at a point about a half radius distance from a central plane, said plane surfaces sloping inwardly from the point of tangency to meet the blade at one end of the blade.

References Cited in the file of this patent

UNITED STATES PATENTS

| | | |
|---|---|---|
| 2,302,663 | Campbell | Nov. 24, 1942 |
| 2,308,727 | Temple | Jan. 19, 1943 |
| 2,342,770 | Temple | Feb. 29, 1944 |
| 2,366,192 | Johnson | Jan. 2, 1945 |
| 2,385,957 | Woodward | Oct. 2, 1945 |
| 2,397,299 | Strid | Mar. 26, 1946 |